UNITED STATES PATENT OFFICE.

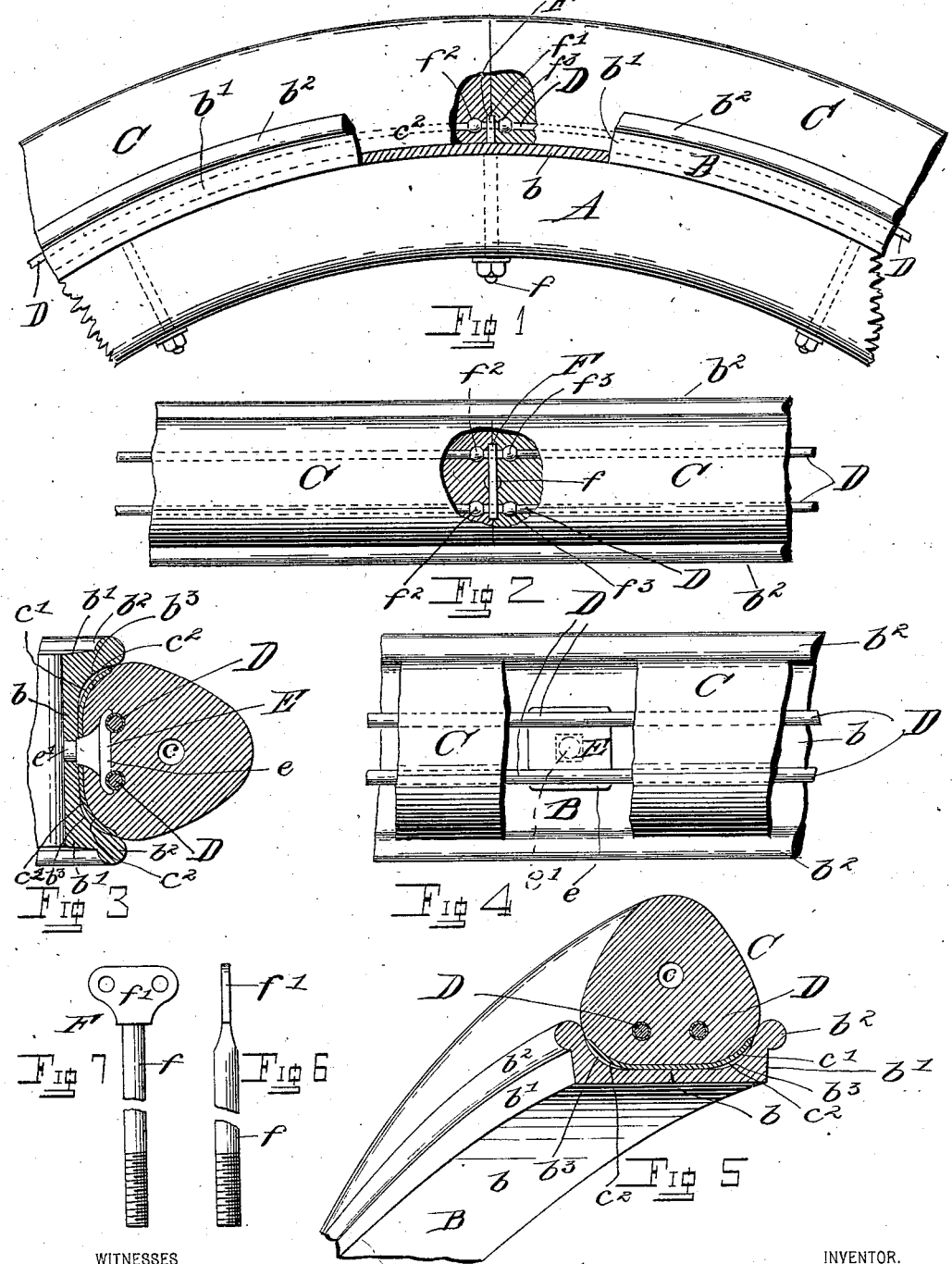

SAM EVERETT FINLEY, OF ATLANTA, GEORGIA.

VEHICLE-TIRE.

SPECIFICATION forming part of Letters Patent No. 594,468, dated November 30, 1897.

Application filed November 30, 1896. Serial No. 614,013. (No model.)

*To all whom it may concern:*

Be it known that I, SAM EVERETT FINLEY, a citizen of the United States of America, and a resident of Atlanta, in the county of Fulton and State of Georgia, have made a certain new and useful Improvement in Vehicle-Tires; and I hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to tires for vehicles, relating more particularly to that class of tires now commonly made of rubber seated in a metallic rim and known as "rubber," "elastic," or "cushion" tires, the object of the invention being to so improve this class of tires as to render the rim stronger and more durable, to prevent same from abrading or cutting the tire, to so form a tire that its life shall be the longest obtainable by so constructing it that its seat in the rim and compression in use may be such as to increase its life beyond those ordinarily in use, and, further, in preventing the creeping of the wires and the tire relative to the rim, the details of all of which will be hereinafter fully specified.

In the accompanying drawings, Figure 1 is a side elevation showing the felly, rim, and tire, and by exsection showing the wires, the welds therein, and the perforated plate. Fig. 2 is a view of the periphery of the tire, further showing the construction of the elements shown in Fig. 1. Fig. 3 is a cross-section of the tire and rim, showing the block for preventing the creeping of the tire and locating the tie-wires and the passages therefor. Fig. 4 is a peripheral view of the tire and rim, showing this block by exsection. Fig. 5 is a sectional perspective view of the tire and rim, showing the peculiar formation of each and the central chamber in the tire. Figs. 6 and 7 are respectively edge and side elevations of the plate before mentioned.

In the figures like reference-characters are uniformly employed in the designation of corresponding elements of construction in all the views.

A is the felly, B the rim, and C the tire. The felly may be of any desired form capable of receiving the rim B thereon. The rim B, as best shown in Fig. 9, consists of a base $b$, having an inner surface adapted to fit the periphery of the felly and preferably to lie continuously in contact therewith. $b'$ are flanges on either edge of said rim, projecting outwardly therefrom, the outer sides of said flanges being substantially perpendicular to the base or under surface of said rim and are provided on their peripheral edges with beads $b^2$, which should be substantially circular in cross-sectional contour and diametrically larger than the thickness of the said flanges, the additional portion which renders them thicker projecting beyond the outer sides of said faces against paving-stones, railway-rails, and other obstructions, whereby the tire C will be prevented from contacting therewith. The inner faces of the flanges $b'$ are curved, as shown, the curve $b^3$ springing from said flange at about the horizontal radial lines of the beads $b^2$ and curving downwardly and inwardly toward the center of the upper surface of the base $b$ of the rim, leaving, however, a flat surface on said upper side about half the width of the rim between the flanges.

The tire C is provided with a chamber $c$, extending longitudinally thereof between its base, which rests in the rim and centrally over said rim and its outer periphery, whereby the continuity of the tire is interrupted radially between the said tread and the holes in the base of the tire which receive the binding-wires D. It has been shown by experience that the line of movement in the tires, being parallel to their convergent sides, compresses the sides of the wire-passages upon the wires used to tie the tire onto the rim, which causes said passages to become cross-sectionally elongated by pressure around the tie-wires, from which elongation result fractures and disintegration of the rubber. Now in order to prevent the heavy pressure upon the outer peripheral side of these wires due to direct compression and the equally heavy pressure upon the inner peripheral side of said wires due to the reactionary compression, I have provided this chamber $c$ and have placed it near the center of the tire in such a manner that imaginary lines drawn through its center and the center of each of the tie-wire passages will lie about parallel to the correlative one of the convergent sides of the tire, which obviously interrupts the continuity of the material in its line of compression against the said tie-wires and to a large degree prevents this heavy direct compression from being exerted upon said tie-wires. This chamber $c$ diverts the motion due to direct compression from a line in the plane of the tire and rim to a direction on each side of the tire substantially parallel to the correlative side of the tire, the natural elasticity of the material assisting. Now in order to further relieve this pressure on the wires I so form the inner periphery of the tire C at $c^2$ that it does not extend to the correlative face of the rim at each corner thereof, but lies normally considerably out of contact therewith and only contacts therewith after the tire shall have been condensed laterally by the inner sides of the outer periphery of the flanges $b'$, which obviously transfers part of the compression due to the compression of the tire in service onto the sides of the tie-wires. The smoothness and evenly-curved surfaces of the flanges at the point of contact normally by the tire reduces the wear to a minimum, and, if desired, the fabric $c'$ on the inner periphery of the tire may be extended past this point of contact. In other words, the base of the tire or the portion which rests within the rim is curved, so that a central zone thereof rests upon the flat portion of the upper surface of the base $b$, and its sides contact with the inner sides of the beads $b^2$ or with the inner sides of the flanges $b'$ at the intersection of the horizontal radius of said beads with their circumference, said tire, however, falling short of contacting with the curved surfaces $b^3$, so that there remains, when the tire is not under compression between the rim and the pavement, a small space between said rim and tire at the inner rounded corners thereof. This in conjunction with the aperture $c$, which acts as hereinbefore specified, direct the strain on said tire under compression into the corners of the rim, or, more properly speaking, against the surfaces $b^3$, whereby a lateral spreading of the base of the tire, which would tend to disintegrate the rubber at its point of contact with the fabric $c'$, is prevented. A slight expansion of the tire laterally above its base is received upon the inner upper sides of the beads $b^2$, which, presenting rounding and unbroken surfaces, obviate all danger of abrading or cracking the tire.

The joint between the ends of the tire may be made in any manner; but the simplest and best form is the usual abutting and adherence of said ends, amounting practically to a butt-weld.

In order to prevent the slipping of the tire within the rim, I incorporate within said tire when same is vulcanized blocks E at the desired intervals, said blocks being larger at their ends nearest the center of the tire and being provided with heads $e$, which prevent their withdrawal from the tire, and in their upper faces are notches or grooves wherein may rest the wires D. $e'$ is a shank or lug on the inner end or side of each of said blocks, which is adapted to enter a suitable hole in the base $b$ of the rim. The conicality of the said blocks or their heads will prevent them from being withdrawn from the tire. The fact that the wires lie along their upper surfaces and that said surfaces are of considerable length along said wires and the fact that each shank $e'$ approximately fits the correlative hole in the rim prevents it from tilting to one side or the other, and the entire device will then obviously prevent the creeping of the tire, which is so destructive to the abutting face of the tire on the rim. This block is of further great advantage to the maker of the tires and increases the life of the tire by locating the tie-wire passages the same distance from the base throughout the entire length of the tire. As the tie-wires lie in the groove of the heads of these blocks E, so may also the core-rods, which are used to make these holes in the vulcanizing process. The advantages of having these tie-wire passages equidistant from the base are too obvious to need explanation.

The creeping of the tire in the rim being now prevented, it is necessary to prevent the creeping of the wires in the tire, which I do by securing same to the rim at the joint of the tire. In Figs. 1, 2, 6, and 7 I show a bridge F, which consists of a bolt $f$, adapted to pass through the tire and felly and having a head $f'$ projecting radially outward from the face of the rim and lying transversely of the same along the joint of the tire, said tire being recessed in one or both ends to accommodate the said head, and said head being perforated or notched concentrically with the passages which receive the wires. In the wires I make a double weld, as shown at $f^2$ and $f^3$, one of said welds being made electrically, if desired, before the wire is put in place and the other one being made after the wire and tire are installed, the tire being compressed endwise and the abutting ends diverged so as to leave the weld-point clear, or the wires may be simply enlarged at these points, as desired. The movement of the wires is hence confined to the length of the space between the welds less the thickness of the head $f'$ of this bridge F.

Having thus described my invention, what I claim as new, and desire to secure by Letters Patent of the United States, is—

1. In a vehicle-tire, a channel-bar rim consisting of a base-web and edge flanges thereon, the inner sides of said flanges and said base-web being of curved surface, said curves springing from the said flanges near their outer peripheries and from said base-web a short distance from its center, and a tire of elastic material adapted to normally contact with said base-web along its center and said flanges near their outer peripheries but lying normally out of contact with the said curved portions of the channel, substantially as specified.

2. In a vehicle-wheel, a rim of channel-iron, a tire of elastic material seated therein, and provided with wire-passages in its base, a series of holes in the base of said channel-iron rim, flanged blocks provided with stems adapted to enter said holes and set in the tire correlatively thereto, the tops of said blocks lying in line with said wire-passages and being correlatively grooved, substantially as and for the purpose specified.

3. In a vehicle-wheel, a channel-rim, a tire adapted to seat in said rim, wire-passages therein, a plate, of metal disposed radially in and secured to said channel-rim in the joint of said tire and being perforated coincidently with said wire-passages in the latter, wires in said wire-passages passing through said plate and enlargements thereon on each side of said plate, substantially as and for the purpose specified.

4. In a vehicle-wheel, a rim of channel-iron, a tire of elastic material adapted to seat therein and being provided with tie-wire passages near its base, and extending longitudinally thereof, a bolt passing through the rim and felly and having a head in the form of a plate lying radially in said rim at the tire-joint and being perforated concentrically with said wire-passages and tie-wires seated in said passages, joined and enlarged on each side of said bolt-head, substantially as and for the purpose specified.

In testimony whereof I hereunto affix my signature in presence of two witnesses.

SAM EVERETT FINLEY.

Witnesses:
A. P. WOOD,
S. M. WOOD.